(12) United States Patent
Ishihara et al.

(10) Patent No.: US 12,368,752 B2
(45) Date of Patent: Jul. 22, 2025

(54) DETECTION SYSTEM, DETECTION METHOD, AND COMPUTER PROGRAM PRODUCT

(71) Applicant: KABUSHIKI KAISHA TOSHIBA, Tokyo (JP)

(72) Inventors: Daiki Ishihara, Yokohama Kanagawa (JP); Fukutomo Nakanishi, Sumida Tokyo (JP); Satoshi Aoki, Kawasaki Kanagawa (JP); Hiroyoshi Haruki, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 473 days.

(21) Appl. No.: 17/819,717

(22) Filed: Aug. 15, 2022

(65) Prior Publication Data
US 2023/0269271 A1    Aug. 24, 2023

(30) Foreign Application Priority Data
Feb. 24, 2022    (JP) .................... 2022-026842

(51) Int. Cl.
*H04L 9/40*    (2022.01)
*G06K 9/00*    (2022.01)

(52) U.S. Cl.
CPC ...... *H04L 63/1466* (2013.01); *H04L 63/1416* (2013.01)

(58) Field of Classification Search
CPC ............. H04L 63/1466; H04L 63/1416; G06F 2218/04
See application file for complete search history.

(56) References Cited

U.S. PATENT DOCUMENTS 7,904,723 B2    3/2011    Shin et al.
8,621,225 B2    12/2013   Shin et al.
(Continued)

FOREIGN PATENT DOCUMENTS

JP    2001078008 A  *  9/1999  .............. G06T 1/00
JP    2003-348318 A    12/2003
(Continued)

OTHER PUBLICATIONS

Harriet J. Fell et al., "Scaling: A Design Pattern in Introductory Computer Science Courses," SIGCSE'97, ACM 1-58113-499-1/97/0006 (Year: 1997).*
(Continued)

*Primary Examiner* — Kambiz Zand
*Assistant Examiner* — Afaq Ali
(74) *Attorney, Agent, or Firm* — Finnegan, Henderson, Farabow, Garrett & Dunner, LLP

(57) ABSTRACT

A detection system 1 includes a control device 10 and a monitoring device 20 communicably connected to the control device 10. An acquisition unit 10A of the control device 10 acquires a target's observation value by a sensor 30. A first-noise-output unit 10B outputs a first-noise-value changing with time and less than a resolution of the sensor 30. An integration unit 10C outputs an integrated value obtained by integrating the first-noise-value and the observation value. A transmission unit 10D transmits the integrated value to the monitoring device 20. A separation unit 20A of the monitoring device 20 separates the integrated value from the control device 10 into the observation value and the first-noise-value. A second-noise-output unit 20B outputs a second-noise-value as the first-noise-value. A detection unit 20C detects whether the integrated value is a replay attack using the spatial distance between the first-noise-value and the second-noise-value.

6 Claims, 13 Drawing Sheets

(56) References Cited

U.S. PATENT DOCUMENTS

| | | | | |
|---|---|---|---|---|
| 11,659,001 | B2* | 5/2023 | Wang | H04L 63/1466 |
| | | | | 726/23 |
| 2011/0184580 | A1* | 7/2011 | Kawamoto | H04L 67/303 |
| 2012/0066764 | A1 | 3/2012 | Kim | |
| 2019/0227114 | A1* | 7/2019 | Anschauer | G01R 31/2829 |
| 2020/0043484 | A1* | 2/2020 | Lesso | G10L 15/20 |
| | | | | 704/233 |
| 2021/0185085 | A1* | 6/2021 | Wang | H04L 63/1466 |
| 2022/0217159 | A1 | 7/2022 | Ito et al. | |
| 2023/0007022 | A1* | 1/2023 | Lu | H04L 45/34 |

FOREIGN PATENT DOCUMENTS

| | | | | |
|---|---|---|---|---|
| JP | 2007-188194 | A | 7/2007 | |
| JP | 2008-527920 | A | 7/2008 | |
| JP | 2008-229961 | A | 10/2008 | |
| JP | 2011-155323 | A | 8/2011 | |
| JP | 2019-175434 | A | 10/2019 | |
| JP | 2020-135073 | A | 8/2020 | |
| SG | 130972 | A1 * | 4/2007 | G06F 21/24 |
| WO | WO2016114950 | A1 * | 1/2015 | H04N 19/467 |

OTHER PUBLICATIONS

Doug Baldwin, "Random Noumbers in Java," Suny Geneseo, Department of Computer Science, Oct. 21, 2011 (Year: 2011).*

Kethan Vooke et al., "Design of Pseudo-Random Number Generator using Non-Linear Feedback Shift Register," 2022 First International Conference on Electrical, Electronics, Information and Communication Technologies (ICEEICT), Date of Conference: Feb. 16-18, 2022 (Year: 2022).*

R. Shirey, Internet Security Glossary, Version 2, Network Working Group, Request for Comments: 4949, Aug. 2007 (Year: 2007).*

Helem Sabina Sanchez et al., "Detection of replay attacks in cyber-physical systems using a frequency-based signature", Journal of the Franklin Institute, vol. 356, No. 5, pp. 2798-2824 (Feb. 12, 2019).

Japan Patent Office, Decision to Grant a Patent in JP App. No. 2022-026842, 1 page, and machine translation, 2 pages (Nov. 26, 2024).

Japan Patent Office, Office action in JP App. No. 2022-026842, 3 pages, with machine translation, 4 pages (Oct. 1, 2024).

* cited by examiner

DETECTION SYSTEM, DETECTION METHOD, AND COMPUTER PROGRAM PRODUCT

CROSS-REFERENCE TO RELATED APPLICATIONS

This application is based upon and claims the benefit of priority from Japanese Patent Application No. 2022-026842, filed on Feb. 24, 2022; the entire contents of which are incorporated herein by reference.

FIELD

Embodiments described herein relate generally to a detection system, a detection method, and a computer program product.

BACKGROUND

A replay attack is known as a threat to an information processing device connected to a network.

As a technology for detecting a threat to the information processing device, for example, a technology for adding a key to a communication layer by dirty paper coding (DPC) is disclosed.

However, in the related art, an applied target is limited to a specific wireless communication protocol, and it has been difficult to detect the replay attack for wired communication or communication using a system-specific communication protocol. That is, in the related art, it has been difficult to detect the replay attack regardless of the communication protocol.

DETAILED DESCRIPTION

Figure 1:
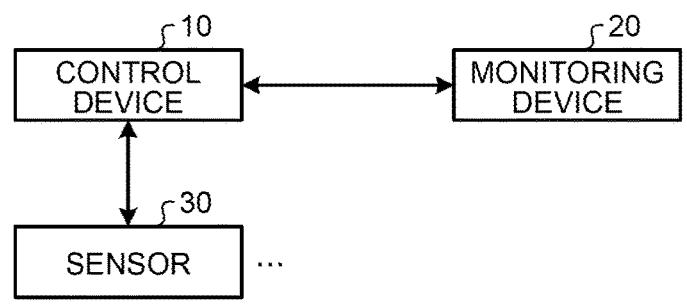
FIG. 1 is a schematic diagram of a detection system.

According to an embodiment, a detection system includes a first information processing device and a second information processing device communicably connected to the first information processing device. The first information processing device includes an acquisition unit, a first noise output unit, an integration unit, and a transmission unit. The acquisition unit acquires an observation value of a target by a sensor. The first noise output unit outputs a first noise value changing with time and being less than a resolution of the sensor. The integration unit outputs an integrated value obtained by integrating the first noise value and the observation value. The transmission unit transmits the integrated value to the second information processing device. The second information processing device includes a separation unit, a second noise output unit, and a detection unit. The separation unit separates the integrated value received from the first information processing device into the observation value and the first noise value. The second noise output unit outputs a second noise value that is the first noise value. The detection unit detects whether or not the integrated value is a replay attack on a basis of a spatial distance between the first noise value and the second noise value.

An object of the embodiments herein is to provide a detection system, a detection method, and a computer program product capable of detecting a replay attack regardless of a communication protocol.

Hereinafter, a detection system, a detection method, and a detection program according to the present embodiment will be described in detail with reference to the accompanying drawings.

Note that, in the following description of each embodiment, portions denoted by the same reference numerals have substantially the same functions, and the description of overlapping portions will be omitted as appropriate.

First Embodiment

FIG. 1 is a schematic diagram of an example of a detection system 1 of the present embodiment.

The detection system 1 is a system that detects a replay attack on the detection system 1.

The detection system 1 includes a control device 10 and a monitoring device 20. The control device 10 and the monitoring device 20 are communicably connected via a network or the like.

The control device 10 is an example of a first information processing device. The monitoring device 20 is an example of a second information processing device.

The first information processing device and the second information processing device are information processing devices communicably connected via a network or the like. The first information processing device is an example of an information processing device that is a transmission source of various data and signals. The second information processing device is an example of an information processing device that receives various data and signals from the first information processing device. Note that the communication protocol used for communication between the first information processing device and the second information processing device is not limited as long as it is an arbitrary communication protocol.

In the present embodiment, a mode in which the first information processing device is the control device 10 and the second information processing device is the monitoring device 20 will be described as an example. The control device 10 is an information processing device that executes control of a member or the like in which a sensor 30 is mounted on the basis of an observation value by the sensor 30. The monitoring device 20 is an information processing device that monitors the control device 10.

The sensor 30 is an observation device that observes a target.

The target is an observation target by the sensor 30. The target is, for example, an environment in which the sensor 30 is installed. The environment in which the sensor 30 is installed is, for example, an internal environment of the member in which the sensor 30 is installed, an external environment of the member in which the sensor 30 is installed, or the like. The member in which the sensor 30 is installed is, for example, a vehicle, and a driving device such as a manufacturing machine, a structure such as a building, or the like.

The sensor 30 observes the target and outputs an observation value, which is a result of observing the target to the control device 10. For example, the sensor 30 detects the temperature, humidity, atmospheric pressure, and the like of the environment in which the sensor 30 is installed. Further, for example, the sensor 30 detects information regarding driving of the member in which the sensor 30 is installed. The information regarding driving is, for example, speed, acceleration, and the like. Furthermore, for example, the sensor 30 detects various signals output from the target such as the drive device by receiving the signals. Then, the sensor 30 outputs these detection results to the control device 10 as observation values that are results of observing the target.

Figure 2:
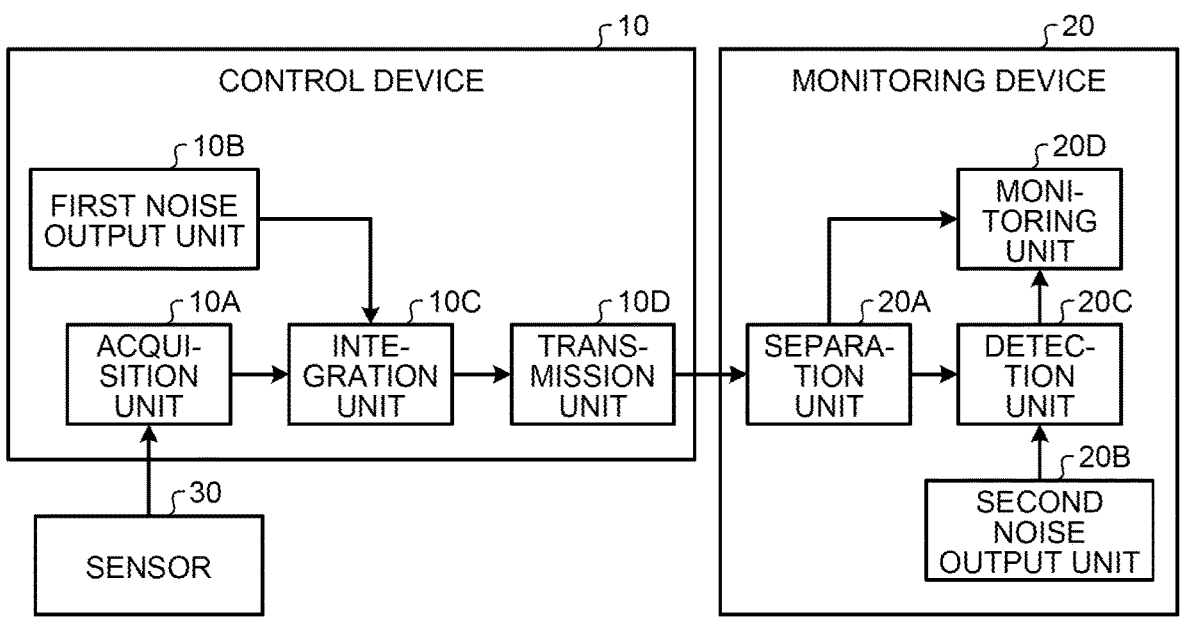
FIG. 2 is a diagram illustrating a functional configuration of the detection system.

FIG. 2 is a diagram illustrating an example of a functional configuration of the detection system 1 of the present embodiment.

The control device 10 includes an acquisition unit 10A, a first noise output unit 10B, an integration unit 10C, and a transmission unit 10D.

The acquisition unit 10A, the first noise output unit 10B, the integration unit 10C, and the transmission unit 10D are implemented by, for example, one or a plurality of processors. For example, each of the above units may be implemented by causing a processor such as a central processing unit (CPU) to execute a program, that is, by software. Each of the above units may be implemented by a processor such as a dedicated IC, that is, hardware. Each of the above units may be implemented by using software and hardware in combination. In a case of using a plurality of processors, each processor may implement one of the respective units, or may implement two or more of the respective units.

The acquisition unit 10A acquires the observation value of the target by the sensor 30. The sensor 30 and the control device 10 are connected so as to be able to exchange data or signals. The acquisition unit 10A outputs the observation value acquired from the sensor 30 to the integration unit 10C.

The first noise output unit 10B outputs a first noise value.

The first noise value is noise that changes with time and is a value less than a resolution of the sensor 30. Furthermore, the first noise value may change with time and be less than the resolution of the sensor 30, and may be a predetermined fixed-point value or less. The digit on which the decimal point represented by the fixed point is placed is only required to be any digit in which the first noise value represented by the decimal point is less than the resolution of the sensor 30.

Note that a plurality of sensors 30 may be connected to the control device 10, and the acquisition unit 10A may acquire the observation value from each of the plurality of sensors 30. In this case, the first noise value is only required to be a value less than the resolution of the sensor 30 having the highest resolution among the plurality of sensors 30 connected to the control device 10. That is, in the present embodiment, the resolution of the sensor 30 represents the resolution of the sensor 30 having the highest resolution among the one or plurality of sensors 30 connected to the control device 10.

The first noise output unit 10B sequentially generates the first noise value satisfying the above condition and outputs the first noise value to the integration unit 10C.

The first noise output unit 10B is configured by a program or a circuit that executes an algorithm for sequentially generating and outputting the first noise value satisfying the above condition.

A program for executing the algorithm for sequentially generating and outputting the first noise value is only required to be created in advance and installed in the control device 10 in advance as the first noise output unit 10B.

Examples of the circuit that sequentially generates the first noise value include a physical unclonable function (PUF). Examples of the PUF include an Arbiter PUF. The output of the Arbiter PUF is a binary number. Thus, in a case where the Arbiter PUF is used as the first noise output unit 10B, the first noise output unit 10B may convert the output of the Arbiter PUF into a decimal number and output the decimal number to the integration unit 10C as the first noise value. Further, the conversion processing from the binary number to the 10 number may be performed by the integration unit 10C.

Note that the first noise output unit 10B outputs the first noise value that satisfies the above condition and has a positive value. Thus, in a case where a program or a circuit that executes the algorithm for sequentially generating and outputting noise generates the first noise value having a negative value, the first noise output unit 10B is only required to output the first noise value having a positive value by outputting the absolute value of the generated first noise value having a negative value. Specifically, it is assumed a case where the algorithm for sequentially generating noise includes a state equation and an output equation. In this case, the first noise output unit 10B is only required to output a positive first noise value by taking an absolute value with respect to the output equation. Further, for example, it is assumed a case where the algorithm for sequentially generating noise includes one equation such as a linear regression model. In this case, the first noise output unit 10B is only required to output the positive first noise value by taking the absolute value of the output value of the equation.

The integration unit 10C outputs an integrated value obtained by integrating the observation value input from the acquisition unit 10A and the first noise value input from the first noise output unit 10B to the transmission unit 10D.

For example, the integration unit 10C adds the observation value input from the acquisition unit 10A and the first noise value input from the first noise output unit 10B to integrate these values, and outputs an integrated value that is an addition result to the transmission unit 10D.

Specifically, a scene is assumed in which the observation value "25.43" is output from the acquisition unit 10A to the integration unit 10C and the first noise value "0.00542" is output from the first noise output unit 10B to the integration unit 10C at a certain timing. In this case, the integration unit 10C outputs "25.43542" that is an addition value of these values to the transmission unit 10D as an integrated value.

The transmission unit 10D transmits the integrated value input from the integration unit 10C to the monitoring device 20 via a network or the like. Thus, the control device 10 sequentially transmits the integrated value obtained by adding the first noise value to the observation value to the monitoring device 20.

Next, the monitoring device 20 will be described.

The monitoring device 20 includes a separation unit 20A, a second noise output unit 20B, a detection unit 20C, and a monitoring unit 20D.

The separation unit 20A separates the integrated value received from the control device 10 into the observation value and the first noise value.

For example, the separation unit 20A separates the integrated value into the observation value and the first noise value by a floor function using the resolution of the sensor 30. Specifically, the separation unit 20A separates the integrated value into the observation value and the first noise value using the following Expressions (1) and (2).

$$y_s(t) = \lfloor \gamma_g^{-1} w(t) \rfloor \quad (1)$$

$$y_{n1}(t) = w(t) - y_s(t) \quad (2)$$

In Expressions (1) and (2), t represents the number of steps, that is, the elapsed time. $y_s(t)$ represents the observation value output in Step t. In Expression (1), $\gamma_g$ represents the resolution of the sensor 30. In Expressions (1) and (2), w (t) represents the integrated value output in Step t. The right side of Expression (1) represents the floor function of a real number "$\gamma_g^- \cdot w(t)$". In Expression (2), $y_{n1}(t)$ represents the first noise value output in Step t.

The separation unit 20A is only required to store the above $\gamma_g$, which is the resolution of the sensor 30, in advance and use the $\gamma_g$ for separation of the integrated value. The separation unit 20A outputs the first noise value obtained by separating the integrated values to the detection unit 20C, and outputs the observation value to the monitoring unit 20D.

The second noise output unit 20B outputs the second noise value that is the first noise value to the detection unit 20C.

The second noise value is the same value as the first noise value. Specifically, the second noise value is noise that changes with time and is a value less than the resolution of the sensor 30, similarly to the first noise value.

The second noise output unit 20B is adjusted in advance so as to output the second noise value that is the same value as the first noise value included in the integrated value input from the control device 10 to the separation unit 20A to the detection unit 20C.

The second noise output unit 20B sequentially generates the second noise value satisfying the above condition and outputs the second noise value to the detection unit 20C.

The second noise output unit 20B includes, for example, the same program or circuit as the first noise output unit 10B. Note that, in a case where the Arbiter PUF, which is a circuit that generates the first noise value, is used as the first noise output unit 10B, a mathematical model of the Arbiter PUF is only required to be applied to the second noise output unit 20B. This is because it is difficult to apply the same PUF to the control device 10 and the monitoring device 20 since the PUF has an ID (identification) unique to the IC chip. Thus, the mathematical model of the Arbiter PUF mounted as the first noise output unit 10B is only required to be generated in advance by a known method using machine learning or the like, and mounted as the second noise output unit 20B in advance in the monitoring device 20.

The detection unit 20C detects whether or not the integrated value received from the control device 10 is the replay attack on the basis of a spatial distance between the first noise value input from the separation unit 20A and the second noise value input from the second noise output unit 20B.

Specifically, in a case where the spatial distance between the first noise value and the second noise value is larger than a threshold, the detection unit 20C detects the integrated value as the replay attack.

Specifically, for example, the detection unit 20C detects the replay attack using Expressions (3) and (4).

$$d(y_{n1}(t), y_{n2}(t)) = |y_{n1}(t) - y_{n2}(t)| \quad (3)$$

$$\text{alert, if } d(y_{n1}(t), y_{n2}(t)) > 0 \quad (4)$$

In Expressions (3) and (4), t represents the number of steps, that is, elapsed time. $y_{n1}(t)$ represents the first noise value output in Step t. $y_{n2}(t)$ represents the second noise value output in Step t.

As described above, the second noise output unit 20B is adjusted in advance so as to output the second noise value that is the same value as the first noise value included in the integrated value input from the control device 10 to the separation unit 20A. Thus, in a case where the detection system 1 is not subjected to the replay attack, the first noise value input from the separation unit 20A to the detection unit 20C and the second noise value input from the second noise output unit 20B to the detection unit 20C are the same value.

Accordingly, in the present embodiment, "0" is used as the threshold used for determining the presence or absence of the replay attack. Then, the detection unit 20C determines whether or not the absolute value of a difference that is represented by the above Expression (3) and is the spatial distance between the first noise value input from the separation unit 20A and the second noise value input from the second noise output unit 20B is larger than the threshold "0" (see Expression (4)). In a case where the absolute value of the difference that is the spatial distance is larger than the threshold "0", the detection unit 20C detects that the integrated value received from the control device 10 is the replay attack. On the other hand, in a case where the absolute value of the difference that is the spatial distance is equal to or less than the threshold "0", the detection unit 20C detects that the integrated value received from the control device 10 is not the replay attack. Then, the detection unit 20C outputs the detection result to the monitoring unit 20D.

Note that, as described above, the first noise output unit 10B outputs the first noise value that changes with time and is a value less than the resolution of the sensor 30. Further, the second noise output unit 20B outputs the first noise value as the second noise value. As described above, the first noise value and the second noise value are noises that change with time and is a value less than the resolution of the sensor 30.

In the present embodiment, the first noise value and the second noise value are preferably values that diverge as time passes. That is, in the present embodiment, it is preferable that the first noise output unit 10B and the second noise output unit 20B output the first noise value and the second noise value, respectively, having divergence that do not approach a finite value in the limit and become infinite or a vibrated value.

For example, it is assumed a case where the first noise value and the second noise value are values that converge according to the lapse of time. That is, it is assumed a case where the first noise output unit 10B and the second noise output unit 20B output the first noise value and the second noise value having convergence, respectively. In this case, it can be difficult for the detection unit 20C to detect the replay attack using the above Expressions (3) and (4). For example, it is assumed that the replay attack is performed using the integrated value recorded in a certain period after the first noise value and the second noise value respectively output from the first noise output unit 10B and the second noise output unit 20B converge. In this case, it is because the first noise value included in the replay attack may coincide with the second noise value output from the second noise output unit 20B.

On the other hand, it is assumed a case where the first noise value and the second noise value are values having divergence. That is, it is assumed a case where the first noise output unit 10B and the second noise output unit 20B output the first noise value and the second noise value having divergence, respectively. In this case, even when the replay attack using the integrated value recorded in any fixed period is performed, the values of the first noise value included in the replay attack and the second noise value output from the second noise output unit 20B do not match. Thus, the first noise value and the second noise value output from the first noise output unit 10B and the second noise output unit 20B, respectively, are preferably values having divergence. In a case where the first noise value and the second noise value are values having divergence, the detection unit 20C can detect the replay attack with high accuracy using the above Expressions (3) and (4).

The monitoring unit 20D executes the monitoring process using the observation value input from the separation unit 20A and the detection result input from the detection unit 20C.

For example, in a case where the detection result input from the detection unit 20C indicates the detection of the replay attack, the monitoring unit 20D executes predetermined attack responding processing or the like with respect to the replay attack. The attack responding processing is only required to be determined in advance. For example, the monitoring unit 20D is only required to execute known attack responding processing such as blocking from the network, identification of an infection route, recovery, and restoration.

On the other hand, in a case where the detection result input from the detection unit 20C indicates non-detection of the replay attack, the monitoring unit 20D is only required to execute predetermined monitoring processing or the like using the observation value input from the separation unit 20A.

Next, an example of a flow of information processing executed by the control device 10 will be described.

Figure 3:
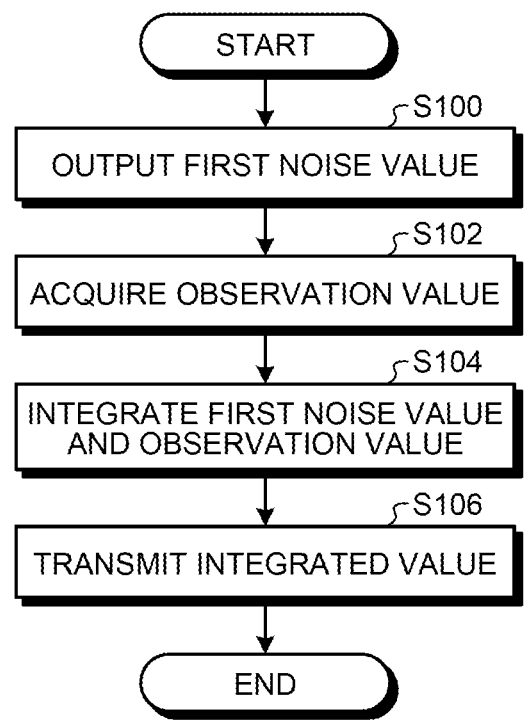
FIG. 3 is a flowchart illustrating a flow of information processing.

FIG. 3 is a flowchart illustrating an example of a flow of information processing executed by the control device 10.

The first noise output unit 10B outputs the first noise value to the integration unit 10C (Step S100). The acquisition unit 10A acquires the observation value from the sensor 30 and outputs the observation value to the integration unit 10C (Step S102).

The integration unit 10C outputs an integrated value obtained by integrating the observation value input from the acquisition unit 10A and the first noise value input from the first noise output unit 10B to the transmission unit 10D (Step S104). The transmission unit 10D transmits the integrated value input from the integration unit 10C to the monitoring device 20 (Step S106). Then, this routine is ended.

Next, an example of a flow of information processing executed by the monitoring device 20 will be described.

Figure 4:
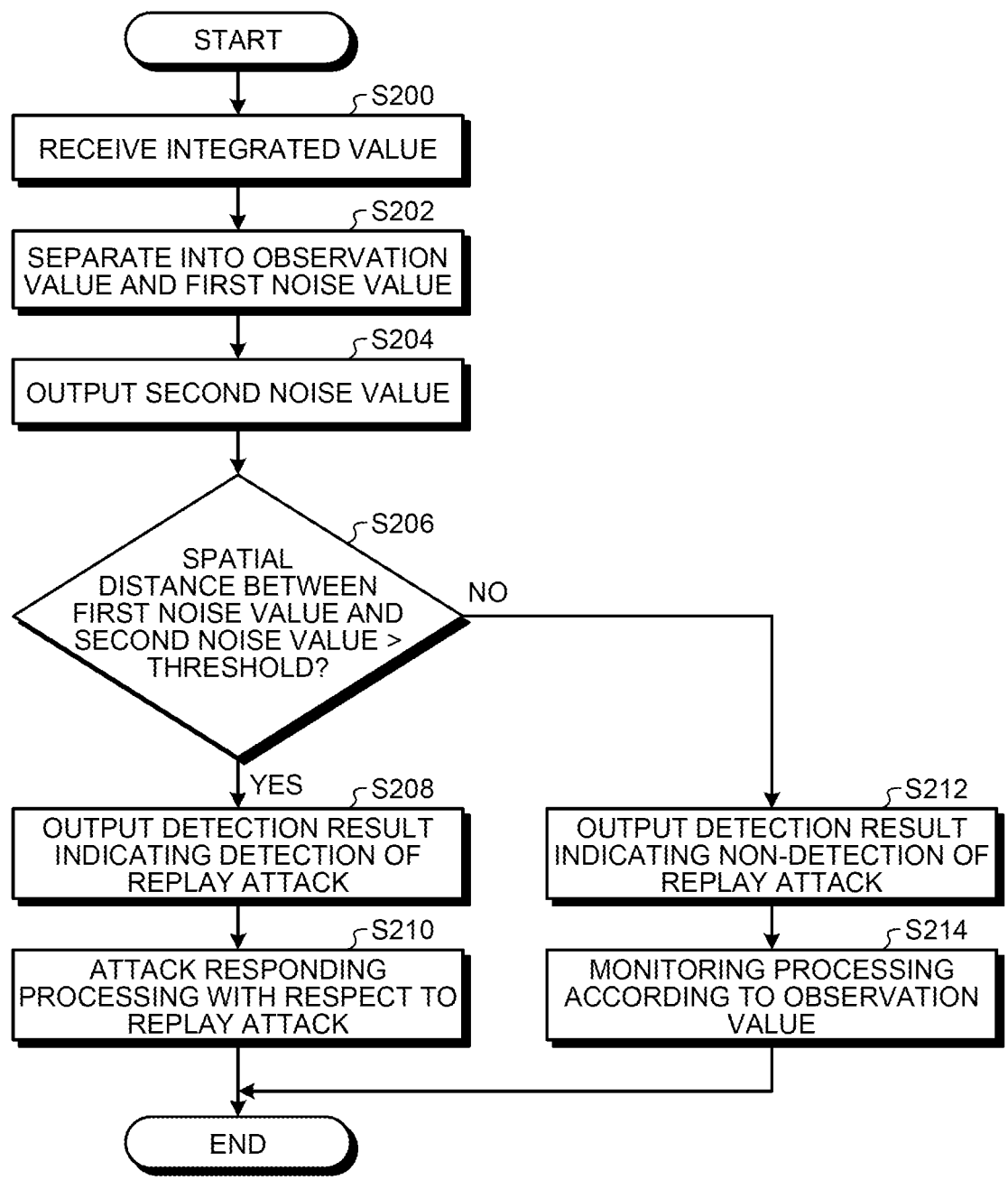
FIG. 4 is a flowchart illustrating a flow of information processing.

FIG. 4 is a flowchart illustrating an example of a flow of information processing executed by the monitoring device 20.

The separation unit 20A receives the integrated value from the control device 10 (Step S200). The separation unit 20A separates the integrated value received in Step S200 into the observation value and the first noise value (Step S202).

The second noise output unit 20B outputs the second noise value to the detection unit 20C (Step S204). As described above, the second noise output unit 20B is adjusted in advance so as to output the second noise value that is the same value as the first noise value included in the integrated value received in Step S200 to the detection unit 20C.

The detection unit 20C determines whether or not the absolute value of the spatial distance between the first noise value separated in Step S202 and the second noise value input from the second noise output unit 20B in Step S204 is larger than the threshold "0" (Step S206).

When an affirmative determination is made in Step S206 (Step S206: Yes), the detection unit 20C outputs a detection result indicating detection of the replay attack to the monitoring unit 20D (Step S208). The monitoring unit 20D to which the detection result indicating the detection of the replay attack is input executes the predetermined attack responding processing or the like with respect to the replay attack (Step S210). Then, this routine is ended.

On the other hand, when a negative determination is made in Step S206 (Step S206: No), the process proceeds to Step S212. In Step S212, the detection unit 20C outputs a detection result indicating non-detection of the replay attack to the monitoring unit 20D (Step S212). The monitoring unit 20D to which the detection result indicating the non-detection of the replay attack is input executes the predetermined monitoring processing or the like using the observation value separated in Step S202 (Step S214). Then, this routine is ended.

As described above, the detection system 1 of the present embodiment includes the control device 10 and the monitoring device 20 communicably connected to the control device 10. The control device 10 includes the acquisition unit 10A, the first noise output unit 10B, the integration unit 10C, and the transmission unit 10D. The acquisition unit 10A acquires the observation value of the target by the sensor 30. The first noise output unit 10B outputs the first noise value that changes with time and is less than the resolution of the sensor 30. The integration unit 10C outputs the integrated value obtained by integrating the first noise value and the observation value. The transmission unit 10D transmits the integrated value to the monitoring device 20. The monitoring device 20 includes the separation unit 20A, the second noise output unit 20B, and the detection unit 20C. The separation unit 20A separates the integrated value received from the control device 10 into the observation value and the first noise value. The second noise output unit 20B outputs the second noise value that is the first noise value. The detection unit 20C detects whether or not the integrated value is the replay attack on the basis of the spatial distance between the first noise value and the second noise value.

As described above, in the detection system 1 of the present embodiment, the control device 10 transmits the integrated value obtained by integrating the first noise value and the observation value to the monitoring device 20. The monitoring device 20 separates the integrated value received from the control device 10 into the observation value and the first noise value. Then, the monitoring device 20 detects whether or not the integrated value received from the control device 10 is the replay attack on the basis of the spatial distance between the separated first noise value and the second noise value input from the second noise output unit 20B.

That is, the detection system 1 of the present embodiment detects whether or not the integrated value is the replay attack using the first noise value added to the observation value by the control device 10 and the second noise value generated by the monitoring device 20.

Thus, in the detection system 1 of the present embodiment, regardless of the communication protocol between the control device 10 and the monitoring device 20, the monitoring device 20 can detect whether or not the integrated value received from the control device 10 is the replay attack.

Thus, the detection system 1 of the present embodiment can detect the replay attack regardless of the communication protocol.

Further, in the detection system 1 of the present embodiment, in addition to the above effects, security of the detection system 1 can be improved.

Further, in the related art, a technique for detecting the replay attack using Dirty Paper Coding (DPC) is disclosed. The calculation of the DPC is known to be complicated, and the use of the DPC sometimes increases the processing load of the device.

On the other hand, in the detection system 1 of the present embodiment, whether or not the integrated value is the replay attack is detected using the first noise value and the second noise value without using the DPC.

Thus, the detection system 1 of the present embodiment can detect the replay attack with a low processing load in addition to the above effects.

Second Embodiment

In the present embodiment, a mode of generating the first noise value and the second noise value by a method different from that of the first embodiment will be described.

Figure 5:
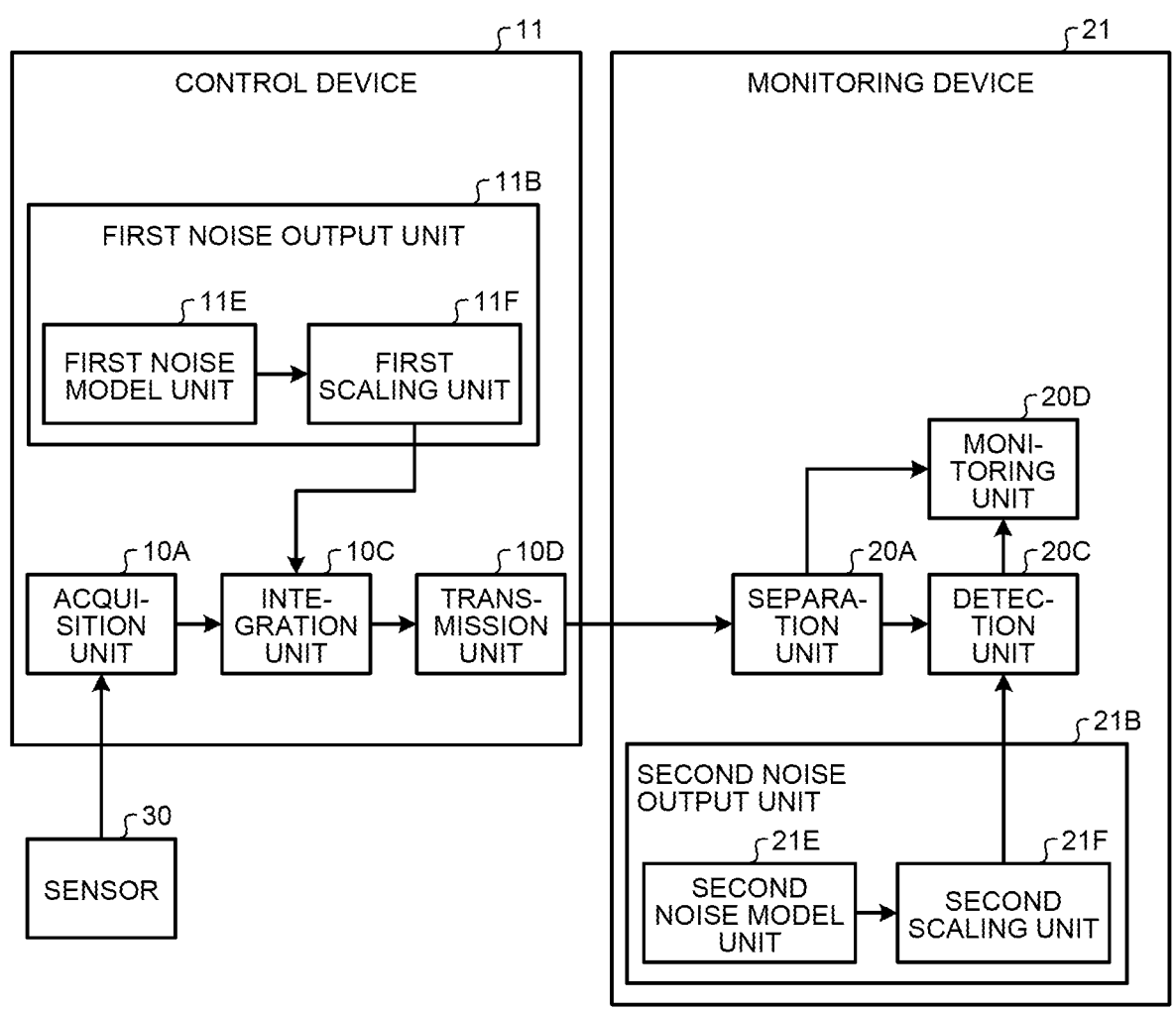
FIG. 5 is a diagram of a functional configuration of a detection system.

FIG. 5 is a diagram illustrating an example of a functional configuration of a detection system 1B of the present embodiment.

The detection system 1B includes a control device 11 and a monitoring device 21. The control device 11 and the monitoring device 21 are communicably connected via a network or the like. The control device 11 is communicably connected to the one or plurality of sensors 30. The detection system 1B has a configuration similar to that of the detection system 1 of the above-described embodiment except that the detection system 1B includes the control device 11 instead of the control device 10 and includes the monitoring device 21 instead of the monitoring device 20.

The control device 11 includes the acquisition unit 10A, a first noise output unit 11B, the integration unit 10C, and the transmission unit 10D. The control device 11 includes the first noise output unit 11B instead of the first noise output unit 10B in the control device 10.

The first noise output unit 11B outputs the first noise value similarly to the first noise output unit 10B of the above-described embodiment.

Here, in the above-described embodiment, it has been described that the first noise value and the second noise value are values that change with time and are less than the resolution of the sensor 30. Further, in the above-described embodiment, it has been described that the first noise value and the second noise value are preferably values that diverge according to the lapse of time, that is, values having divergence.

However, in a case where the first noise output unit 10B and the second noise output unit 20B outputs the first noise value and the second noise value having divergence, respectively, there are cases where each of the output first noise value and second noise value reaches the resolution of the sensor 30 or more by continuously generating and outputting these values for a long time.

Accordingly, the first noise output unit 11B of the present embodiment includes a first noise model unit 11E and a first scaling unit 11F.

The first noise model unit 11E outputs a first noise output value that changes nonlinearly with time and varies non-periodically within a specific value range.

The first noise output value is a value that has no convergence, changes nonlinearly with time, and varies non-periodically within the specific value range. That is, the first noise output value is a value that does not have both convergence and divergence, changes nonlinearly, and varies non-periodically within the specific value range.

The first noise model unit 11E sequentially generates the first noise output value satisfying the above condition and outputs the first noise output value to the first scaling unit 11F. The first noise model unit 11E is configured by a program or a circuit that executes an algorithm for sequentially generating and outputting the first noise output value satisfying the above condition.

The program that executes the algorithm for sequentially generating and outputting the first noise output value is only required to be created in advance and installed in the control device 10 in advance as the first noise model unit 11E.

As the program that executes the algorithm for sequentially generating and outputting the first noise output value, for example, a program using a non-periodic function is only required to be used. The non-periodic function is a function that does not exhibit periodicity, such as a sin function and a cos function. The non-periodicity means that the object does not converge to an equilibrium point, that the object does not have a periodic orbit, and the like.

For example, examples of the program that executes the algorithm for sequentially generating and outputting the first noise output value include a program using a chaotic mapping. The chaotic mapping is an algorithm having initial value sensitivity and non-periodicity. The initial value sensitivity means a property that the output difference increases with the number of steps (that is, the lapse of time) due to a very small error in the initial value even in the same system.

Examples of the chaotic mapping include a Logistic map, a tent mapping, a Bernoulli mapping, an Henon mapping, and the like.

The first noise model unit 11E outputs the generated first noise output value to the first scaling unit 11F.

The first scaling unit 11F outputs the first noise value obtained by reducing the first noise output value input from the first noise model unit 11E to less than the resolution of the sensor 30.

As described above, the first noise model unit 11E outputs, to the first scaling unit 11F, the first noise output value that does not have convergence and is a value that changes nonlinearly with time and varies non-periodically within the specific value range. Thus, the first noise output value output from the first noise model unit 11E may become a value equal to or larger than the resolution of the sensor 30 according to the lapse of time.

Accordingly, the first scaling unit 11F reduces the first noise output value input from the first noise model unit 11E to less than the resolution of the sensor 30. Then, the first scaling unit 11F outputs the first noise value, which is the reduced first noise output value, to the integration unit 10C.

For example, it is assumed a case where the first noise model unit 11E is a program using the Logistic map. The Logistic map is represented by the following Expression (5).

$$x(t+1)=ax(t)(1-x(t)) \; (0 \le x \le 1) \qquad (5)$$

In Expression (5), t represents the number of steps, that is, the elapsed time. a is a parameter. x is the first noise output value. In a case where the Logistic map is used, x varies non-periodically within a range of values "0" to "1". x(t+1) represents the first noise output value output from the first noise model unit 11E in Step t+1, that is, this time. x(t) represents Step t, that is, the first noise output value output by the first noise model unit 11E last time.

In a case where the first noise model unit 11E is the program using the Logistic map, the first noise output value output from the first noise model unit 11E is a value that changes nonlinearly with time and varies non-periodically within a range from a value "0" to a value "1", which is within the specific value range. However, the first noise output value output from the first noise model unit 11E may be a value equal to or larger than the resolution of the sensor 30 according to the lapse of time.

As described in the first embodiment, the first noise value input to the integration unit 10C needs to be less than the resolution of the sensor 30. Accordingly, the first scaling unit 11F reduces (scales) the first noise output value output from the first noise model unit 11E to less than the resolution of the sensor 30. Specifically, the first scaling unit 11F calculates the first noise value by reducing the first noise output value to less than the resolution of the sensor 30 by the following Expression (6).

$$y(t)=\gamma x(t) \qquad (6)$$

In Expression (6), γ is a reduction ratio. The first scaling unit 11F is only required to store γ in advance and use γ for reducing the first noise output value. x(t) has the same meaning as in the above Expression (5). y(t) represents the first noise value output in Step t.

The acquisition unit 10A, the integration unit 10C, and the transmission unit 10D included in the control device 11 are similar to those of the control device 10 of the above-described embodiment.

Next, the monitoring device 21 will be described.

The monitoring device 21 includes the separation unit 20A, a second noise output unit 21B, the detection unit 20C, and the monitoring unit 20D. The monitoring device 21 includes the second noise output unit 21B instead of the second noise output unit 20B in the monitoring device 20.

The second noise output unit 21B includes a second noise model unit 21E and a second scaling unit 21F.

The second noise model unit 21E outputs a second noise output value, which is the first noise output value, to the second scaling unit 21F. The second scaling unit 21F outputs the second noise value obtained by reducing the second noise output value by the reduction ratio of the first noise value to the detection unit 20C.

The second noise model unit 21E is adjusted in advance so as to output, to the second scaling unit 21F, the second noise output value that is the same value as the first noise output value, which is a value before scaling by the first scaling unit 11F of the first noise value input from the control device 11 to the separation unit 20A and included in the integrated value.

The second noise model unit 21E sequentially generates the second noise output value satisfying the above condition and outputs the second noise output values to the second scaling unit 21F.

The second noise model unit 21E includes, for example, the same program or circuit as the first noise model unit 11E. Note that, in a case where the Arbiter PUF, which is a circuit that generates the first noise output value, is used as the first noise model unit 11E, the mathematical model of the Arbiter PUF is only required to be applied to the second noise model unit 21E. For example, the mathematical model of the Arbiter PUF mounted as the first noise model unit 11E is only required to be generated in advance by a known method using machine learning or the like, and mounted as the second noise model unit 21E in the monitoring device 21.

In a case where the first noise model unit 11E is a program using the Logistic map, the second noise model unit 21E is only required to be a program that generates the second noise output value using the same program. In this case, in the above Expression (5), x(t+1) represents the second noise output value that is output by the second noise model unit 21E in Step t+1, that is, this time, and x (t) represents the second noise output value that has been output by the second noise model unit 21E in Step t+1, that is, last time.

The second noise model unit 21E outputs the generated second noise output value to the second scaling unit 21F.

The second scaling unit 21F generates the second noise value obtained by reducing the second noise output value input from the second noise model unit 21E by the same reduction ratio as the first scaling unit 11F, and outputs the second noise value to the detection unit 20C. Similarly to the first scaling unit 11F, the second scaling unit 21F is only required to generate the second noise value using the above Expression (6). The second scaling unit 21F is only required to store γ, which is the reduction ratio used by the first scaling unit 11F, in advance and generate the second noise value using the above Expression (6). In this case, in the above Expression (6), y(t) represents the second noise value output in Step t.

The separation unit 20A, the detection unit 20C, and the monitoring unit 20D included in the monitoring device 21 are similar to those of the monitoring device 20 of the above-described embodiment.

Next, an example of a flow of information processing executed by the control device 11 will be described.

Figure 6:
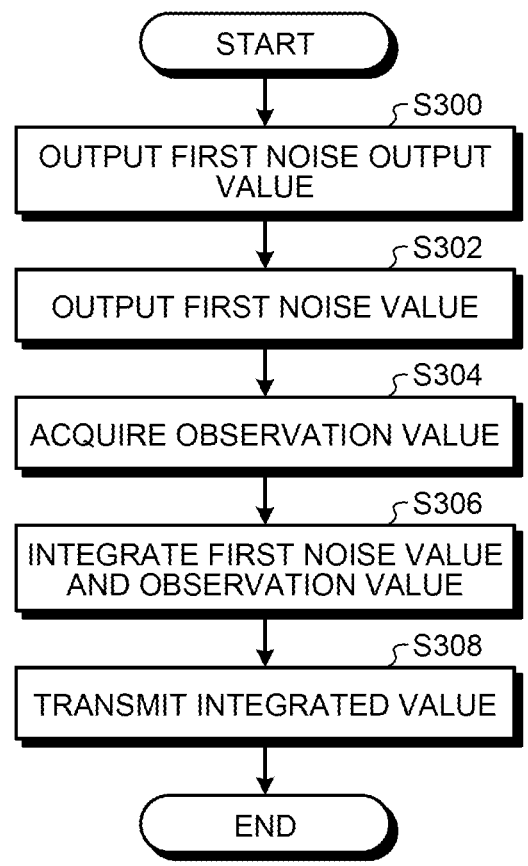
FIG. 6 is a flowchart illustrating a flow of information processing.

FIG. 6 is a flowchart illustrating an example of a flow of information processing executed by the control device 11.

The first noise model unit 11E outputs the first noise output value to the first scaling unit 11F (Step S300). The first scaling unit 11F outputs the first noise value obtained by reducing the first noise output value input from the first noise model unit 11E to less than the resolution of the sensor 30 to the integration unit 10C (Step S302).

The acquisition unit 10A acquires the observation value from the sensor 30 (Step S304).

The integration unit 10C outputs an integrated value obtained by integrating the observation value input from the acquisition unit 10A and the first noise value input from the first noise output unit 11B to the transmission unit 10D (Step S306). The transmission unit 10D transmits the integrated value input from the integration unit 10C to the monitoring device 21 (Step S308). Then, this routine is ended.

Next, an example of a flow of information processing executed by the monitoring device 21 will be described.

Figure 7:
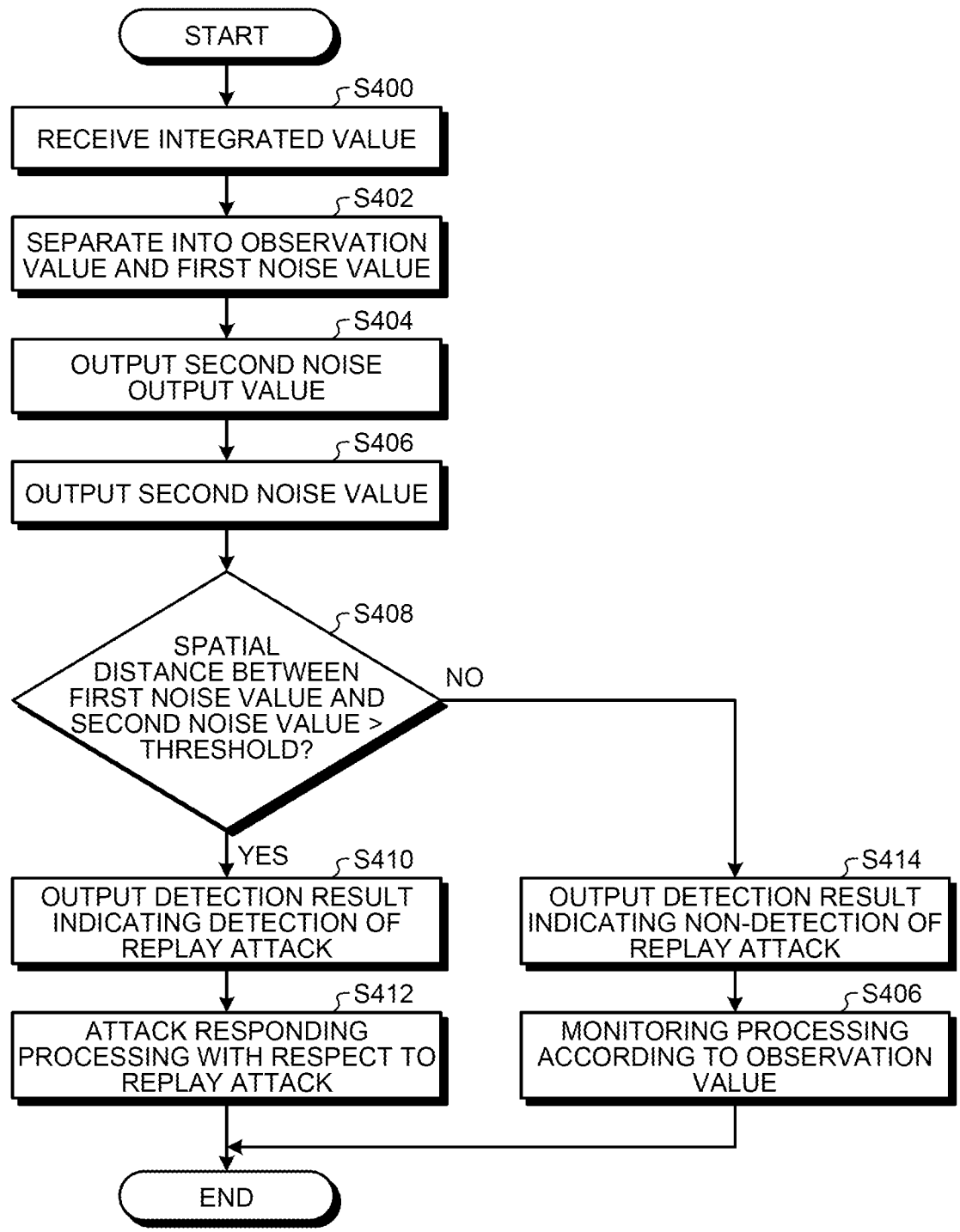
FIG. 7 is a flowchart illustrating a flow of information processing.

FIG. 7 is a flowchart illustrating an example of a flow of information processing executed by the monitoring device 21.

The separation unit 20A receives the integrated value from the control device 10 (Step S400). The separation unit 20A separates the integrated value received in Step S400 into the observation value and the first noise value (Step S402).

The second noise model unit 21E outputs the second noise output value to the second scaling unit 21F (Step S404). The second scaling unit 21F outputs the second noise value obtained by reducing the second noise output value input from the second noise model unit 21E by the same reduction ratio as the first noise value to the detection unit 20C (Step S406).

The detection unit 20C determines whether or not the absolute value of the spatial distance between the first noise value separated in Step S402 and the second noise value input from the second noise output unit 21B in Step S406 is larger than the threshold "0" (Step S408).

When an affirmative determination is made in Step S408 (Step S408: Yes), the detection unit 20C outputs a detection result indicating detection of the replay attack to the monitoring unit 20D (Step S410). The monitoring unit 20D to which the detection result indicating the detection of the replay attack is input executes the predetermined attack responding processing or the like with respect to the replay attack (Step S412). Then, this routine is ended.

On the other hand, when a negative determination is made in Step S408 (Step S408: No), the process proceeds to Step S414. In Step S414, the detection unit 20C outputs a detection result indicating non-detection of the replay attack to the monitoring unit 20D (Step S414). The monitoring unit 20D to which the detection result indicating the non-detection of the replay attack is input executes the predetermined monitoring processing or the like using the observation value separated in Step S402 (Step S416). Then, this routine is ended.

As described above, in the detection system 1B of the present embodiment, the first noise output unit 11B of the control device 11 includes the first noise model unit 11E and the first scaling unit 11F. Further, the second noise output unit 21B of the monitoring device 21 includes a second noise model unit 21E and a second scaling unit 21F.

The first noise model unit 11E outputs the first noise output value that changes nonlinearly with time and varies non-periodically within the specific value range. The first scaling unit 11F outputs the first noise value obtained by reducing the first noise output value to less than the resolution of the sensor 30. The second noise model unit 21E outputs the second noise output value that is a first noise output value. The second scaling unit 21F outputs the second noise value obtained by reducing the second noise output value by the reduction ratio of the first noise value.

The first noise output value and the second noise output value output from the first noise model unit 11E and the second noise model unit 21E, respectively, are values that change nonlinearly with time and vary non-periodically within the specific value range.

Here, it is assumed a case where values having periodicity are used as the first noise output value and the second noise output value output from the first noise model unit 11E and the second noise model unit 21E, respectively. Further, it is assumed a case where the control device 11 and the monitoring device 21 do not include the first scaling unit 11F and the second scaling unit 21F, respectively.

In this case, an algorithm used for noise generation having periodicity may be estimated by using machine learning or the like from time-series data of the integrated value sequentially transmitted from the control device 11 to the monitoring device 21.

On the other hand, in the detection system 1B of the present embodiment, the first noise model unit 11E and the second noise model unit 21E output the first noise output value and the second noise output value, respectively, which are values that change nonlinearly with time and vary non-periodically within the specific value range.

Thus, in the detection system 1B of the present embodiment, it is possible to suppress estimation of the algorithm used to generate the first noise output value included in the integrated value transmitted from the control device 11 to the monitoring device 21. Therefore, the detection system 1B of the present embodiment can detect the replay attack with high accuracy in addition to the effects of the above-described embodiment.

Note that the first noise output value and the second noise output value output from the first noise model unit 11E and the second noise model unit 21E, respectively, may be values equal to or larger than the resolution of the sensor 30 according to the lapse of time.

On the other hand, in the detection system 1B of the present embodiment, the first scaling unit 11F reduces the first noise output value output from the first noise model unit 11E to less than the resolution of the sensor 30, and outputs the first noise output value as the first noise value. Further, the second scaling unit 21F outputs the second noise value obtained by reducing the second noise output value output from the second noise model unit 21E by the reduction ratio to the first noise value.

Thus, the first noise value and the second noise value output to the integration unit 10C and the detection unit 20C, respectively, can be suppressed from becoming a value equal to or larger than the resolution of the sensor 30.

Thus, the detection unit 20C of the monitoring device 21 can easily detect whether or not the integrated value is the replay attack by determining whether or not the spatial distance between the first noise value input from the separation unit 20A and the second noise value input from the second noise output unit 21B is larger than the threshold.

Thus, the detection system 1B of the present embodiment can detect the replay attack with high accuracy in addition to the effects of the above-described embodiment. Further, according to the detection system 1B of the present embodiment, the replay attack can be easily detected even when each of the first noise output value and the second noise output value generated by the first noise model unit 11E and the second noise model unit 21E becomes a value equal to or larger than the resolution of the sensor 30.

Third Embodiment

In the present embodiment, a mode in which each of the control device and the monitoring device includes a plurality of noise output units will be described.

Figure 8:
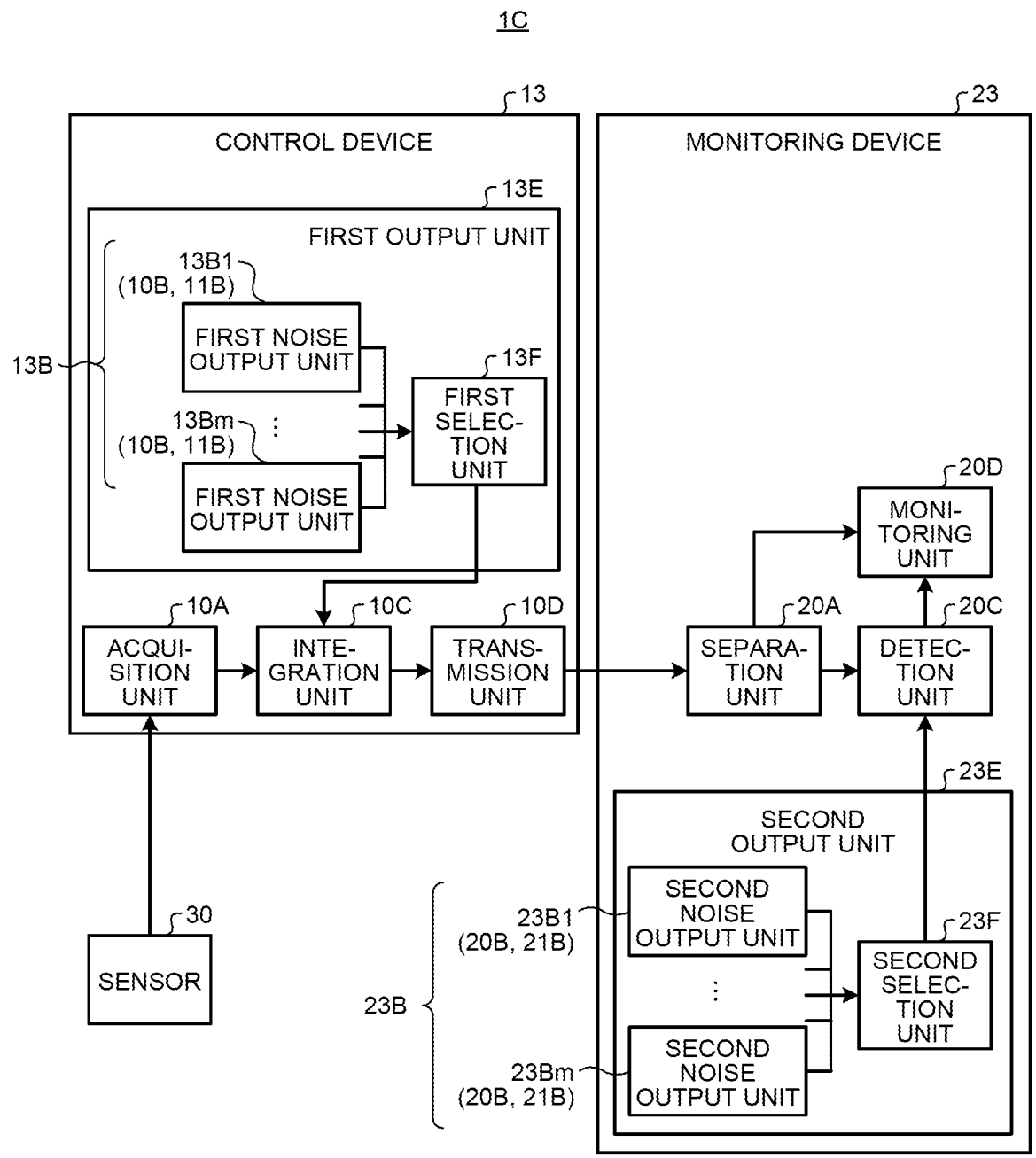
FIG. 8 is a diagram illustrating a functional configuration of a detection system.

FIG. 8 is a diagram illustrating an example of a functional configuration of a detection system 1C of the present embodiment.

The detection system 1C includes a control device 13 and a monitoring device 23. The control device 13 and the monitoring device 23 are communicably connected via a network or the like. The control device 13 is communicably connected to the one or plurality of sensors 30. The detection system 1C has a configuration similar to that of the detection system 1 of the above-described embodiment except that the detection system 1C includes the control device 13 instead of the control device 10 and includes the monitoring device 23 instead of the monitoring device 20.

The control device 13 includes the acquisition unit 10A, a first output unit 13E, the integration unit 10C, and the transmission unit 10D. The control device 13 includes the first output unit 13E instead of the first noise output unit 10B in the control device 10.

The first output unit 13E outputs the first noise value similarly to the first noise output unit 10B of the above-described embodiment.

The first output unit 13E of the present embodiment includes a plurality of first noise output units 13B and a first selection unit 13F.

FIG. 8 illustrates a mode in which the first output unit 13E includes m first noise output units 13B of first noise output unit 13B1 to first noise output unit 13Bm. m is an integer of 2 or more.

The plurality of first noise output units 13B outputs different first noise values. That is, the plurality of first noise output units 13B is different in at least a part of the algorithm for outputting the first noise value. The plurality of first noise output units 13B includes, for example, the first noise output unit 10B and the first noise output unit 11B in the above-described embodiment.

Identification information (hereinafter, referred to as ID) for uniquely identifying each of the plurality of first noise output units 13B included in the first output unit 13E is added in advance to each of the plurality of first noise output units 13B.

The first selection unit 13F selects one of the plurality of first noise output units 13B according to a predetermined selection rule, and outputs the first noise value output from the selected first noise output unit 13B to the integration unit 10C.

The first selection unit 13F selects one of the respective IDs of the plurality of first noise output units 13B to thereby select the first noise output unit 13B identified by the selected ID. The first selection unit 13F selects the ID of one first noise output unit 13B using an algorithm that can uniquely determine the ID instead of a random number.

Specifically, for example, the first selection unit 13F selects the ID of one first noise output unit 13B among the plurality of first noise output units 13B using the following Expression (7).

$$x_{selector}(t+1) = x_{selector}(t) + b \bmod n \qquad (7)$$

In Expression (7), $x_{selector}(t+1)$ represents Step t+1, that is, the ID of the first noise output unit 13B selected by the first selection unit 13F this time. In Expression (7), $x_{selector}(t)$ represents the ID of the first noise output unit 13B selected last time, that is, in Step t by the first selection unit 13F. n is an integer representing the number of first noise output units 13B. For example, a value from 0 to n−1 is defined as the ID. In this case, the maximum value of the above-described m is a value that matches n−1. b is a parameter and a non-negative number. mod represents the modulo.

The first selection unit 13F selects the ID of one first noise output unit 13B among the plurality of first noise output units 13B using the above Expression (7).

Note that the first selection unit 13F may select the ID of one first noise output unit 13B among the plurality of first noise output units 13B by selecting an ID of which the number is shifted by one from the previously selected ID in each step.

The first selection unit 13F selects one first noise output unit 13B identified by the selected ID. Then, the first selection unit 13F outputs the first noise value output from the selected first noise output unit 13B to the integration unit 10C.

The acquisition unit 10A, the integration unit 10C, and the transmission unit 10D included in the control device 13 are similar to those of the control device 10 of the above-described embodiment.

The monitoring device 23 includes the separation unit 20A, a second output unit 23E, the detection unit 20C, and the monitoring unit 20D. The monitoring device 23 includes a second output unit 23E instead of the second noise output unit 20B in the monitoring device 20.

The second output unit 23E includes a plurality of second noise output units 23B that is the plurality of first noise output units 13B. That is, the second output unit 23E includes a plurality of second noise output units 23B that is the same as the plurality of first noise output units 13B provided in the first output unit 13E, respectively.

That is, the second output unit 23E includes m second noise output units 23B of a second noise output unit 23B1 to a second noise output unit 23Bm. The second noise output unit 23B1 to second noise output unit 23Bm are the same as the first noise output unit 13B1 to the first noise output unit 13Bm of the first output unit 13E, respectively.

Then, each of the plurality of second noise output unit 23B1 to second noise output unit 23Bm outputs, as the second noise value, the same first noise value as the corresponding first noise output unit 13B1 to first noise output unit 13Bm.

Thus, the plurality of second noise output units 23B outputs different second noise values to each other. That is, the plurality of second noise output units 23B is different in at least a part of an algorithm for outputting the second noise value. The plurality of second noise output units 23B includes, for example, the second noise output unit 20B and the second noise output unit 21B in the above-described embodiment.

Similarly to those of the plurality of first noise output units 13B, an ID for uniquely identifying each of the plurality of second noise output units 23B included in the second output unit 23E is added in advance to each of the plurality of second noise output units 23B. The same ID as the ID added to each of the corresponding plurality of first noise output units 13B is added to each of the plurality of second noise output units 23B.

A second selection unit 23F selects one of the plurality of second noise output units 23B according to the same selection rule as the selection rule used in the first selection unit 13F. That is, the second selection unit 23F is adjusted in advance so as to select the second noise output unit 23B1 corresponding to the first noise output unit 13B that has output the first noise value included in the integrated value input from the control device 13 to the separation unit 20A among the plurality of first noise output units 13B included in the first output unit 13E.

Then, the second selection unit 23F outputs the second noise value output from the selected first noise output unit 13B to the detection unit 20C. Thus, the second output unit 23E is adjusted in advance so as to output the second noise value that is the same value as the first noise value included in the integrated value input from the control device 13 to the separation unit 20A to the detection unit 20C.

The separation unit 20A, the detection unit 20C, and the monitoring unit 20D included in the monitoring device 23 are similar to those of the monitoring device 20 of the above-described embodiment.

Next, an example of a flow of information processing executed by the control device 13 will be described.

Figure 9:
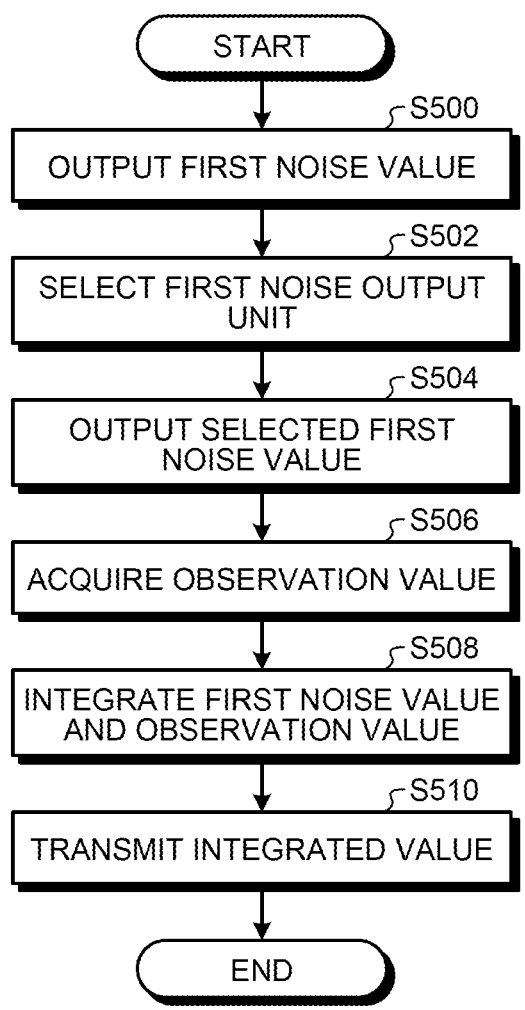
FIG. 9 is a flowchart illustrating a flow of information processing.

FIG. 9 is a flowchart illustrating an example of a flow of information processing executed by the control device 13.

Each of the plurality of first noise output units 13B included in the first output unit 13E outputs the first noise value to the first selection unit 13F (Step S500). The first selection unit 13F selects one of the plurality of first noise output units 13B according to the predetermined selection rule (Step S502). The first selection unit 13F outputs the first noise value input from the selected one first noise output unit 13B to the integration unit 10C (Step S504).

The acquisition unit 10A acquires the observation value from the sensor 30 (Step S506).

The integration unit 10C outputs an integrated value obtained by integrating the observation value input from the acquisition unit 10A and the first noise value input from the first selection unit 13F to the transmission unit 10D (Step S508). The transmission unit 10D transmits the integrated value input from the integration unit 10C to the monitoring device 21 (Step S510). Then, this routine is ended.

Next, an example of a flow of information processing executed by the monitoring device 23 will be described.

Figure 10:
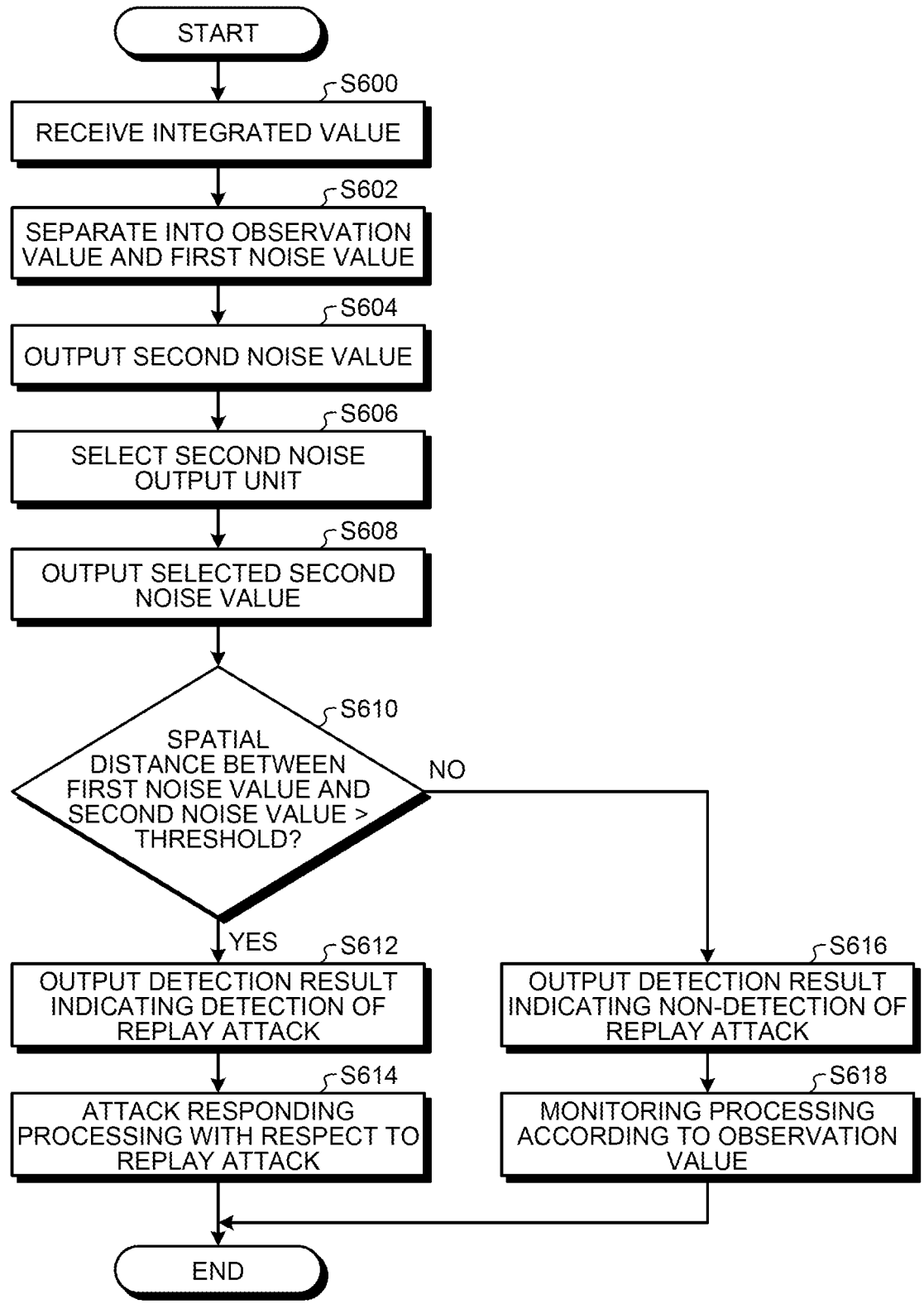
FIG. 10 is a flowchart illustrating a flow of information processing.

FIG. 10 is a flowchart illustrating an example of a flow of information processing executed by the monitoring device 23.

The separation unit 20A receives the integrated value from the control device 13 (Step S600). The separation unit 20A separates the integrated value received in Step S600 into the observation value and the first noise value (Step S602).

Each of the plurality of second noise output units 23B included in the second output unit 23E outputs the second noise value to the second selection unit 23F (Step S604). The second selection unit 23F selects one of the plurality of second noise output units 23B according to the predetermined selection rule (Step S606). The second selection unit 23F selects the same second noise output unit 23B as the first noise output unit 13B selected by the first selection unit 13F. The second selection unit 23F outputs the second noise value input from the selected one second noise output unit 23B to the detection unit 20C (Step S608).

The detection unit 20C determines whether or not the absolute value of the spatial distance between the first noise value separated in Step S602 and the second noise value input from the second selection unit 23F in Step S608 is larger than the threshold "0" (Step S610).

When an affirmative determination is made in Step S610 (Step S610: Yes), the detection unit 20C outputs a detection result indicating detection of the replay attack to the monitoring unit 20D (Step S612). The monitoring unit 20D to which the detection result indicating the detection of the replay attack is input executes the predetermined attack responding processing or the like with respect to the replay attack (Step S614). Then, this routine is ended.

On the other hand, when a negative determination is made in Step S610 (Step S610: No), the process proceeds to Step S616. In Step S616, the detection unit 20C outputs a detection result indicating non-detection of the replay attack to the monitoring unit 20D (Step S616). The monitoring unit 20D to which the detection result indicating the non-detection of the replay attack is input executes the predetermined monitoring processing or the like using the observation value separated in Step S612 (Step S618). Then, this routine is ended.

As described above, in the detection system 1C of the present embodiment, the first output unit 13E of the control device 13 includes the plurality of first noise output units 13B that output the first noise values different from each other and the first selection unit 13F. The first selection unit 13F selects one of the plurality of first noise output units 13B according to the predetermined selection rule, and outputs the first noise value output from the selected first noise output unit 13B to the integration unit 10C.

Further, the second output unit 23E of the monitoring device 23 includes the plurality of second noise output units 23B that is the plurality of first noise output units 13B, and the second selection unit 23F. The second selection unit 23F selects the first noise output unit 13B selected by the first selection unit 13F on the basis of the selection rule as the selected second noise output unit 23B among the plurality of second noise output units 23B, and outputs the second noise value output from the selected second noise output unit 23B to the detection unit 20C.

As described above, in the detection system 1C of the present embodiment, the plurality of noise output units (first noise output units 13B or second noise output units 23B) is used in each of the control device 13 and the monitoring device 23. Then, in the detection system 1C of the present embodiment, the integrated value is transmitted and the replay attack is detected using the noise value (first noise value or second noise value) output from the different noise output unit in each step.

Here, an algorithm used for noise generation may be estimated by using machine learning or the like from time-series data of the integrated value sequentially transmitted from the control device 13 to the monitoring device 23.

On the other hand, in the detection system 1C of the present embodiment, each of the control device 13 and the monitoring device 23 includes a plurality of noise output units, and the integrated value is transmitted and the replay attack is detected using the noise value output from the noise output unit different in each step.

Thus, in the detection system 1C of the present embodiment, it is possible to suppress estimation of the algorithm used to generate the first noise value included in the integrated value transmitted from the control device 13 to the monitoring device 23. Therefore, the detection system 1C of the present embodiment can detect the replay attack with high accuracy in addition to the effects of the above-described embodiment.

Fourth Embodiment

In the present embodiment, a mode of adding a random number to the first noise value output from the first noise output unit will be described.

Figure 11:
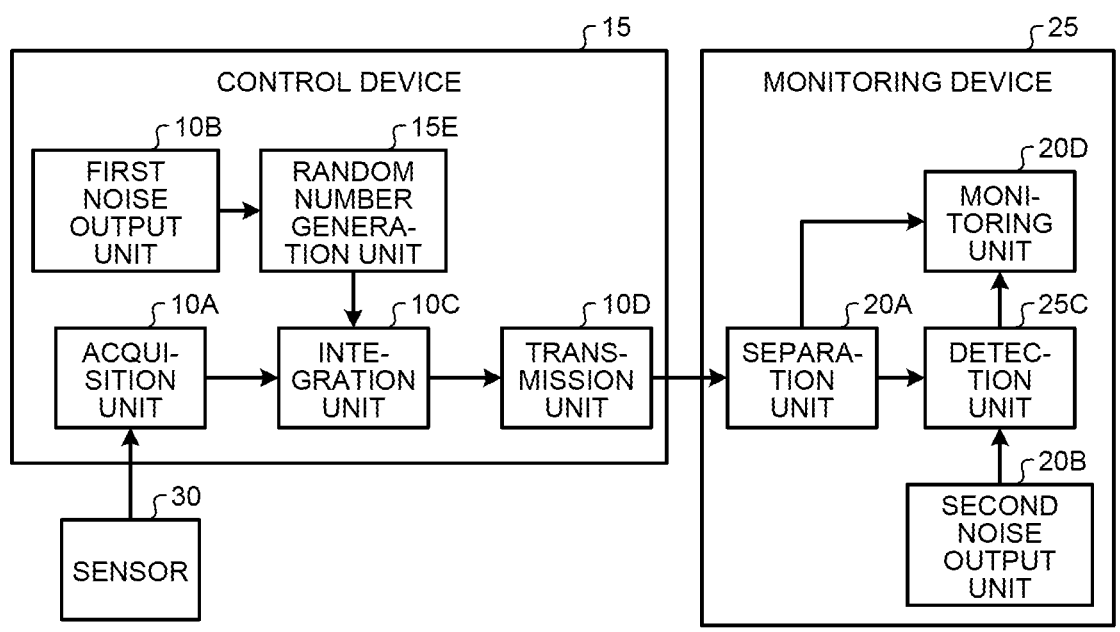
FIG. 11 is a diagram illustrating a functional configuration of a detection system.

FIG. 11 is a diagram illustrating an example of a functional configuration of a detection system 1D of the present embodiment.

The detection system 1D includes a control device 15 and a monitoring device 25. The control device 15 and the monitoring device 25 are communicably connected via a network or the like. The control device 15 is communicably connected to the one or plurality of sensors 30. The detection system 1D has a configuration similar to that of the detection system 1 of the above-described embodiment except that the detection system 1D includes the control device 15 instead of the control device 10 and includes the monitoring device 25 instead of the monitoring device 20.

The control device 15 includes the acquisition unit 10A, the first noise output unit 10B, the integration unit 10C, the transmission unit 10D, and a random number generation unit 15E. The control device 15 further includes the random number generation unit 15E in the configuration of the control device 10.

The random number generation unit 15E adds a random number to the first noise value output from the first noise output unit 10B, and outputs the first noise value to the integration unit 10C.

The random number generation unit 15E generates an arbitrary value between a predetermined lower limit value and an upper limit value as a random number in each step. Then, the random number generation unit 15E adds the generated random number to the first noise value input from the first noise output unit 10B, and outputs the first noise value to the integration unit 10C.

The acquisition unit 10A, the integration unit 10C, and the transmission unit 10D included in the control device 12 are similar to those of the control device 10 of the above-described embodiment. The integration unit 10C and the transmission unit 10D generate the integrated value and transmit the integrated value to the monitoring device 25 as in the above-described embodiment except that the first noise value to which the random number is added by the random number generation unit 15E is used as the first noise value. That is, in the present embodiment, the integrated value of the observation value and the first noise value to which the random number is added is transmitted from the control device 15 to the monitoring device 25.

The monitoring device 25 includes the separation unit 20A, the second noise output unit 20B, a detection unit 25C, and the monitoring unit 20D. The monitoring device 25 includes the detection unit 25C instead of the detection unit 20C in the monitoring device 20.

In a case where the spatial distance between the first noise value to which the random number is added and input from the separation unit 20A and the second noise value input from the second noise output unit 20B is larger than a threshold corresponding to the random number, the detection unit 25C detects the integrated value received from the control device 15 as the replay attack.

That is, in the present embodiment, the detection unit 25C uses a value corresponding to the random number added by the random number generation unit 15E as the threshold used for detecting the replay attack. Specifically, the detection unit 25C uses, as the threshold, the maximum value of the absolute value of the lower limit value and the absolute value of the upper limit value of the random number added by the random number generation unit 15E.

Specifically, the detection unit 25C uses a threshold represented by the following Expression (8) for detection of the replay attack. Then, in a case where Expression (9) is satisfied, the detection unit 25C detects the integrated value as the replay attack.

$$r_{thread} = \max\{|r_{upper}|, |r_{lower}|\} \quad (8)$$

$$\text{alert, if } d(y_{n1}(t), y_{n2}(t)) > r_{thread} \quad (9)$$

In Expressions (8) and (9), $\gamma_{upper}$ represents the upper limit value of the random number added by the random number generation unit 15E. $\gamma_{lower}$ represents a lower limit value of the random number added by the random number generation unit 15E. $\gamma_{thread}$ represents the threshold used for detecting the replay attack. $y_{n1}(t)$ represents the first noise value to which the random number is added, output from the separation unit 20A to the detection unit 25C. $y_{n2}(t)$ represents the second noise value output from the second noise output unit 20B to the detection unit 25C. max is a max function.

As indicated in the above expressions (8) and (9), in the present embodiment, the maximum value of the absolute value of the lower limit value and the absolute value of the upper limit value of the random number added by the random number generation unit 15E is used as the threshold used for determining the presence or absence of the replay attack. However, it is assumed that the range of the random number generated by the random number generation unit 15E is adjusted in advance such that the threshold is a value smaller than the minimum value of the absolute values of the values that can be respectively taken as the first noise value and the second noise value.

Then, the detection unit 25C determines whether or not the absolute value of a difference that is a spatial distance between the first noise value to which the random number is added and input from the separation unit 20A and the second noise value input from the second noise output unit 20B is larger than the threshold. In a case where the absolute value of the difference that is the spatial distance is larger than the threshold, the detection unit 25C detects that the integrated value received from the control device 15 is the replay attack. On the other hand, in a case where the absolute value of the difference that is the spatial distance is equal to or less than the threshold, the detection unit 25C detects that the integrated value received from the control device 15 is not the replay attack. Then, the detection unit 25C outputs the detection result to the monitoring unit 20D.

Next, an example of a flow of information processing executed by the control device 15 will be described.

Figure 12:
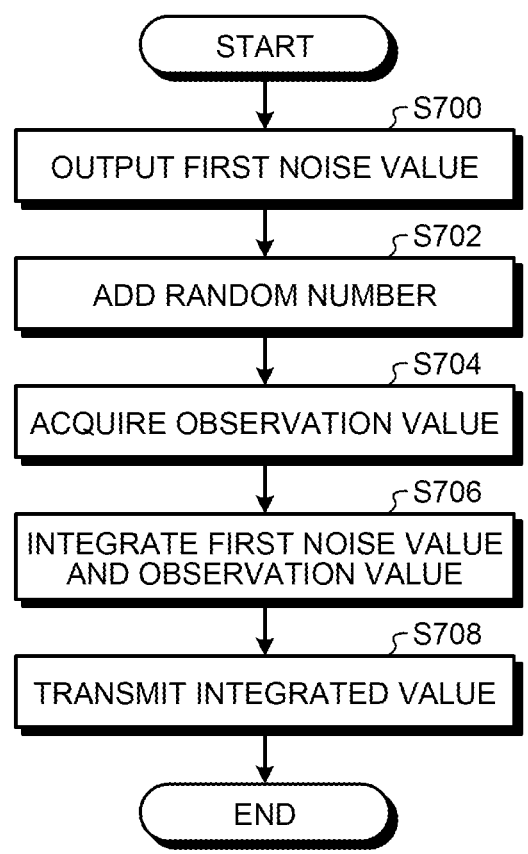
FIG. 12 is a flowchart illustrating a flow of information processing.

FIG. 12 is a flowchart illustrating an example of a flow of information processing executed by the control device 15.

The first noise output unit 10B outputs the first noise value to the random number generation unit 15E (Step S700). The random number generation unit 15E adds a random number to the first noise value input from the first noise output unit 10B, and outputs the first noise value to the integration unit 10C (Step S702).

The acquisition unit 10A acquires the observation value from the sensor 30 (Step S704).

The integration unit 10C outputs an integrated value obtained by integrating the observation value input from the acquisition unit 10A and the first noise value to which the random number is added input from the random number generation unit 15E is added to the transmission unit 10D (Step S706). The transmission unit 10D transmits the integrated value input from the integration unit 10C to the monitoring device 25 (Step S708). Then, this routine is ended.

Next, an example of a flow of information processing executed by the monitoring device 25 will be described.

Figure 13:
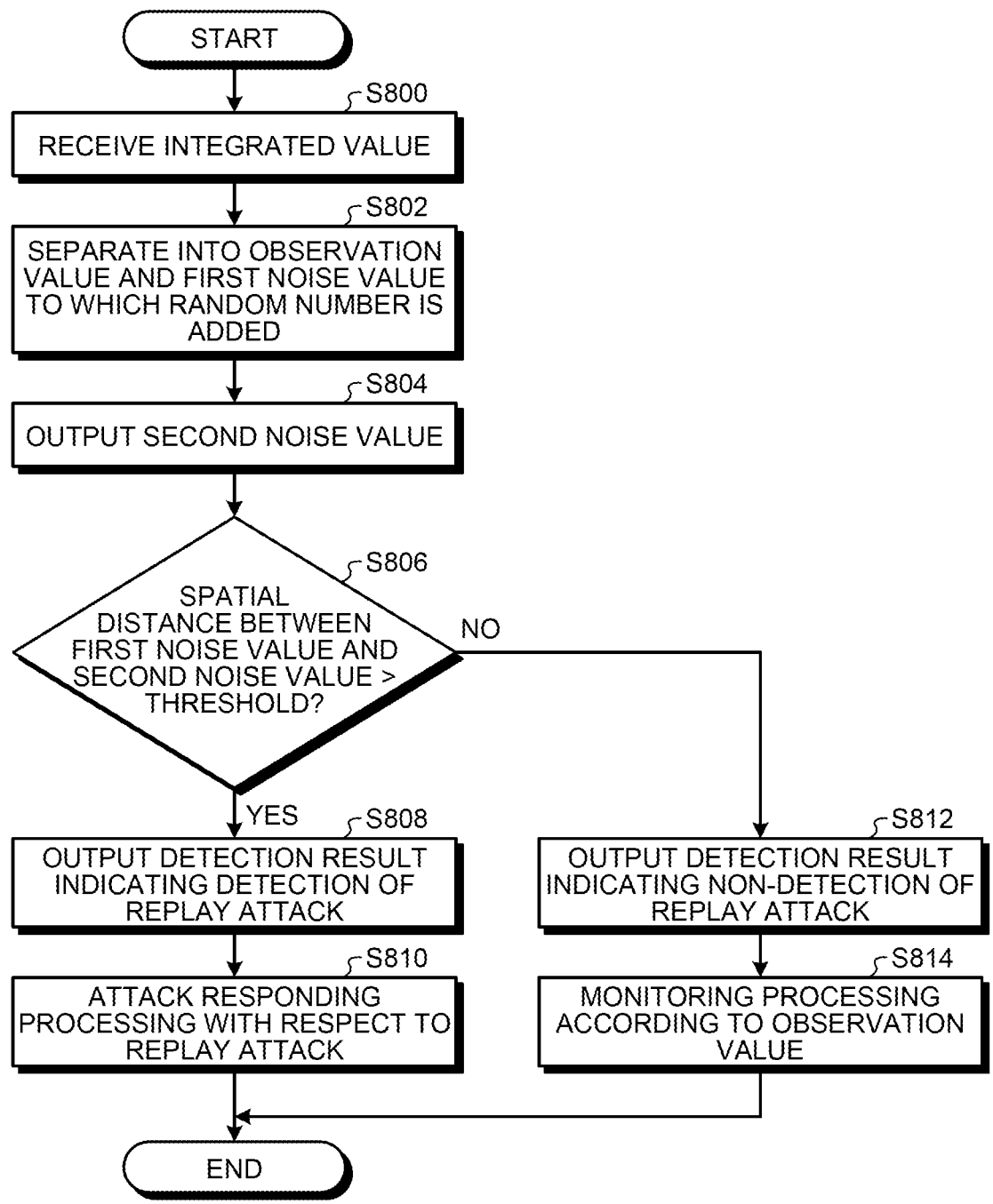
FIG. 13 is a flowchart illustrating a flow of information processing.

FIG. 13 is a flowchart illustrating an example of a flow of information processing executed by the monitoring device 25.

The separation unit 20A receives the integrated value from the control device 10 (Step S800). The separation unit 20A separates the integrated value received in Step S800 into the observation value and the first noise value to which the random number is added (Step S802).

The second noise output unit 20B outputs the second noise value to the detection unit 25C (Step S804).

The detection unit 25C determines whether or not the absolute value of the spatial distance between the first noise value to which the random number is added and separated in Step S802 and the second noise value input from the second noise output unit 20B in Step S804 is larger than the threshold (Step S806). In Step S806, the maximum value of the absolute value of the lower limit value and the absolute value of the upper limit value of the random number added by the random number generation unit 15E is used as the threshold.

When an affirmative determination is made in Step S806 (Step S806: Yes), the detection unit 25C outputs a detection result indicating detection of the replay attack to the monitoring unit 20D (Step S808). The monitoring unit 20D to which the detection result indicating the detection of the replay attack is input executes the predetermined attack responding processing or the like with respect to the replay attack (Step S810). Then, this routine is ended.

On the other hand, when a negative determination is made in Step S806 (Step S806: No), the process proceeds to Step S812. In Step S812, the detection unit 25C outputs a detection result indicating non-detection of the replay attack to the monitoring unit 20D (Step S812). The monitoring unit 20D to which the detection result indicating the non-detection of the replay attack is input executes the predetermined monitoring processing or the like using the observation value separated in Step S802 (Step S814). Then, this routine is ended.

As described above, in the detection system 1D of the present embodiment, the random number generation unit 15E adds a random number to the first noise value output from the first noise output unit 10B, and outputs the first noise value to the integration unit 10C. Then, the integration unit 10C and the transmission unit 10D transmit the integrated value of the first noise value to which the random number is added and the observation value to the monitoring device 25.

Here, an algorithm used for noise generation may be estimated by using machine learning or the like from time-series data of the integrated value sequentially transmitted from the control device 15 to the monitoring device 25.

On the other hand, the detection system 1D of the present embodiment transmits the integrated value of the first noise value to which the random number is added and the first noise value to the monitoring device 25.

Thus, in the detection system 1D of the present embodiment, it is possible to suppress estimation of the algorithm used to generate the first noise value included in the integrated value transmitted from the control device 15 to the monitoring device 25. Therefore, the detection system 1D of the present embodiment can detect the replay attack with high accuracy in addition to the effects of the above-described embodiment.

Further, in the detection system 1D of the present embodiment, as compared with the detection system 1C of the third embodiment, in each of the control device 15 and the monitoring device 25, each of one first noise output unit 10B and one second noise output unit 20B generates the noise value (first noise value or second noise value). Thus, the detection system 1D of the present embodiment can reduce the calculation load and detect the replay attack with high accuracy.

Next, an example of a hardware configuration of the control device 10, the control device 11, the control device 15, the monitoring device 20, the monitoring device 21, and the monitoring device 25 of the above-described embodiments will be described.

Figure 14:
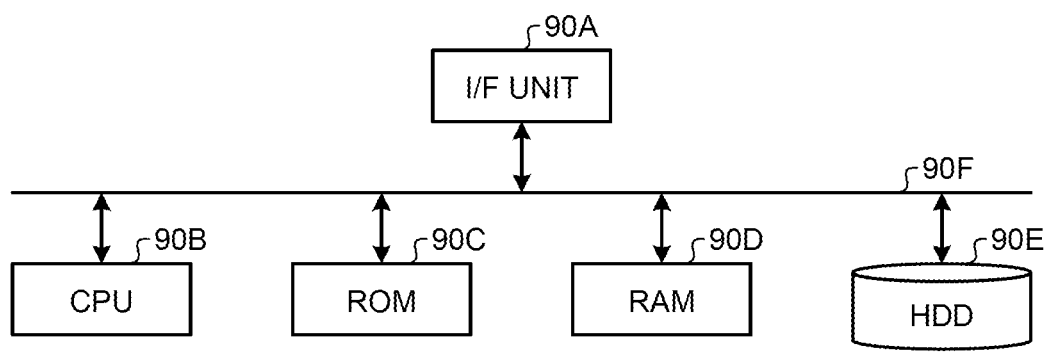
FIG. 14 is a hardware configuration diagram.

FIG. 14 is a hardware configuration diagram of an example of the control device 10, the control device 11, the control device 15, the monitoring device 20, the monitoring device 21, and the monitoring device 25 of the above-described embodiments.

The control device 10, the control device 11, the control device 15, the monitoring device 20, the monitoring device 21, and the monitoring device 25 of the above-described embodiments include a control device such as a central processing unit (CPU) 90B, a storage device such as a read only memory (ROM) 90C, a random access memory (RAM) 90D, or a hard disk drive (HDD) 90E, an I/F unit 90A that is an interface with various devices, and a bus 90F that connects the respective units, and have a hardware configuration using a normal computer.

In the control device 10, the control device 11, the control device 15, the monitoring device 20, the monitoring device 21, and the monitoring device 25 of the above-described embodiments, the CPU 90B reads a program from the ROM 90C onto the RAM 90D and executes the program, to thereby implement the above respective units on the computer.

Note that a program for executing each of the above-described processes executed by the control device 10, the control device 11, the control device 15, the monitoring device 20, the monitoring device 21, and the monitoring device 25 of the above-described embodiments may be stored in the HDD 90E. In addition, the program for executing each of the above-described processes executed by the control device 10, the control device 11, the control device 15, the monitoring device 20, the monitoring device 21, and the monitoring device 25 of the above-described embodiments may be provided by being incorporated in the ROM 90C in advance.

In addition, the program for executing the above-described processes executed by the control device 10, the control device 11, the control device 15, the monitoring device 20, the monitoring device 21, and the monitoring device 25 of the above-described embodiments may be stored as a file in an installable format or an executable format in a computer-readable storage medium such as a CD-ROM, a CD-R, a memory card, a digital versatile disc (DVD), or a flexible disk (FD) and provided as a computer program product. Further, the program for executing the above-described processes executed by the control device 10, the control device 11, the control device 15, the monitoring device 20, the monitoring device 21, and the monitoring device 25 of the above-described embodiments may be provided by being stored in a computer connected to a network such as the Internet and downloaded via the network. Furthermore, the program for executing the above-described processes executed by the control device 10, the control device 11, the control device 15, the monitoring device 20, the monitoring device 21, and the monitoring device 25 of the above-described embodiments may be provided or distributed via a network such as the Internet.

Note that, although the embodiments has been described above, the above-described embodiments are presented as an example and is not intended to limit the scope of the embodiments. This novel embodiment can be implemented in various other forms, and various omissions, substitutions, and changes can be made without departing from the gist of the embodiments. These embodiments and modifications thereof are included in the scope and gist of the embodiments, and are included in the embodiments described in the claims and the equivalent scope thereof.

For example, in the above-described embodiments, a mode in which the first information processing device is the control device 10, the control device 11, the control device 13, or the control device 15 has been described as an example. Further, in the above-described embodiments, a mode in which the second information processing device is the monitoring device 20, the monitoring device 21, the monitoring device 23, or the monitoring device 25 has been described as an example.

However, the first information processing device and the second information processing device are only required to be an information processing device communicably connected via a network or the like, and are not limited to the control device and the monitoring device. For example, a mode may be employed in which the first information processing device functions as a client of the client server system, and the second information processing device functions as a server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system comprising a first information processing device and a second information processing device communicably connected to the first information processing device via a network, wherein
    the first information processing device comprises one or more first hardware processors configured to:
        acquire a first observation value of a target by a sensor;
        output a first noise output value that changes nonlinearly with time and varies non-periodically within a specific value range, by executing a chaotic mapping algorithm having initial value sensitivity for which an output difference increases with lapse of time;
        output a first noise value changing with time and being less than a resolution of the sensor, by reducing the first noise output value to less than a resolution of the sensor;
        output an integrated value obtained by integrating the first noise value and the first observation value; and
        transmit the integrated value to the second information processing device via the network, and
    the second information processing device comprises one or more second hardware processors configured to:
        separate the integrated value received from the first information processing device via the network into a second observation value and a third noise value;
        outputs a second noise output value that is the first noise output value;
        output a second noise value by reducing the second noise output value by a reduction ratio of the first noise value; and
        detect whether or not the integrated value is a replay attack on a basis of a spatial distance between the third noise value and the second noise value.

2. The detection system according to claim 1, wherein the one or more second hardware processors of the second information processing device are configured to detect the integrated value as the replay attack in a case where the spatial distance is larger than a threshold.

3. The detection system according to claim 1, wherein the first information processing device further comprises:
    a plurality of third hardware processors that output first noise values different from each other, and
    wherein the one or more first hardware processors of the first information processing device are configured to select one of the plurality of third hardware processors according to a predetermined selection rule and output the first noise value output from the selected third hardware processor, and
the second information processing device further comprises:
    a plurality of fourth hardware processors each corresponding to one of the plurality of third hardware processors, and
    wherein the one or more second hardware processors of the second information processing device are configured to select one of the plurality of fourth hardware processors that corresponds to the third hardware processor selected by the one or more first hardware processors of the first information processing device on the basis of the predetermined selection rule, and output the second noise value output from the selected third hardware processor.

4. The detection system according to claim 1, wherein the one or more first hardware processors of the first information processing device are further configured to add a random number to the first noise value before integrating the first noise value and the first observation value, and
    the one or more second hardware processors of the second information processing device detects the integrated value as the replay attack in a case where a spatial distance between the third noise value and the second noise value is larger than a threshold corresponding to the random number.

5. A computer program product having a non-transitory computer-readable medium including programmed instructions stored therein, wherein the instructions, when executed by a computer of a detection system including a first information processing device and a second information processing device communicably connected to the first information processing device via a network, cause the computer to perform:
    acquiring, by the first information processing device, a first observation value of a target by a sensor;
    outputting, by the first information processing device, a first noise output value that changes nonlinearly with time and varies non-periodically within a specific value range, by executing a chaotic mapping algorithm having initial value sensitivity for which an output difference increases with lapse of time;
    outputting, by the first information processing device, a first noise value changing with time and being less than a resolution of the sensor, by reducing the first noise output value to less than a resolution of the sensor;
    outputting, by the first information processing device, an integrated value obtained by integrating the first noise value and the first observation value;
    transmitting, by the first information processing device, the integrated value to the second information processing device via the network;
    separating, by the second information processing device, the integrated value received from the first information processing device via the network into a second observation value and a third noise value;
    outputting, by the second information processing device, a second noise output value that is the first noise output value;
    outputting, by the second information processing device, a second noise value by reducing the second noise output value by a reduction ratio of the first noise value; and detecting whether or not the integrated value is a replay attack on a basis of a spatial distance between the third noise value and the second noise value.

6. A detection method executed by a computer of a detection system including a first information processing device and a second information processing device communicably connected to the first information processing device via a network, the detection method comprising:

acquiring, by the first information processing device, a first observation value of a target by a sensor;

outputting, by the first information processing device, a first noise output value that changes nonlinearly with time and varies non-periodically within a specific value range, by executing a chaotic mapping algorithm having initial value sensitivity for which an output difference increases with lapse of time;

outputting, by the first information processing device, a first noise value changing with time and being less than a resolution of the sensor, by reducing the first noise output value to less than a resolution of the sensor;

outputting, by the first information processing device, an integrated value obtained by integrating the first noise value and the first observation value;

transmitting, by the first information processing device, the integrated value to the second information processing device via the network;

separating, by the second information processing device, the integrated value received from the first information processing device via the network into a second observation value and a third noise value;

outputting, by the second information processing device, a second noise output value that is the first noise output value;

outputting, by the second information processing device, a second noise value by reducing the second noise output value by a reduction ratio of the first noise value; and detecting, by the second information processing device, whether or not the integrated value is a replay attack on a basis of a spatial distance between the third noise value and the second noise value.

* * * * *